United States Patent
Veit (10) Patent No.: US 9,436,916 B2
(45) Date of Patent: Sep. 6, 2016

(54) METHOD FOR DETERMINING A CORRECTION CHARACTERISTIC CURVE

(75) Inventor: Guenter Veit, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 515 days.

(21) Appl. No.: 13/808,060

(22) PCT Filed: Jun. 27, 2011

(86) PCT No.: PCT/EP2011/060679
§ 371 (c)(1),
(2), (4) Date: Mar. 11, 2013

(87) PCT Pub. No.: WO2012/000920
PCT Pub. Date: Jan. 5, 2012

(65) Prior Publication Data
US 2013/0166482 A1 Jun. 27, 2013

(30) Foreign Application Priority Data
Jul. 2, 2010 (DE) .......................... 10 2010 030 872

(51) Int. Cl.
| F02D 41/14 | (2006.01) |
| G06N 99/00 | (2010.01) |
| F02D 41/24 | (2006.01) |
| F02D 41/38 | (2006.01) |
| F02M 63/02 | (2006.01) |
| F02D 41/30 | (2006.01) |

(52) U.S. Cl.
CPC ......... *G06N 99/005* (2013.01); *F02D 41/1402* (2013.01); *F02D 41/2422* (2013.01); *F02D 41/2464* (2013.01); *F02D 41/2477* (2013.01); *F02D 41/3845* (2013.01); *F02D 41/3854* (2013.01); *F02D 41/2467* (2013.01); *F02D 41/3082* (2013.01); *F02D 2041/141* (2013.01); *F02D 2041/1409* (2013.01); *F02D 2200/0602* (2013.01); *F02D 2200/0604* (2013.01); *F02D 2250/04* (2013.01); *F02D 2250/31* (2013.01); *F02M 63/0225* (2013.01)

(58) Field of Classification Search
USPC .......................................... 706/20
See application file for complete search history.

(56) References Cited

U.S. PATENT DOCUMENTS

| 5,804,940 A | * | 9/1998 | Erkens | ................... G05B 19/19 318/364 |
| 2007/0272208 A1 | * | 11/2007 | Holl | .................... F02D 41/2464 123/344 |
| 2009/0082946 A1 | * | 3/2009 | Ishizuka | ............. F02D 41/1498 701/106 |

FOREIGN PATENT DOCUMENTS

| CN | 1309237 | 8/2001 |
| DE | 10 2004 053124 | 7/2005 |

(Continued)

OTHER PUBLICATIONS

Tenth Scandinavian COnference on Artificial Intelligenc, SCAI 2008, p. 74. "Performance of the ALgorithm on the Fuel Injection SYstem Model".*

*Primary Examiner* — Stanley K Hill
*Assistant Examiner* — Benjamin Buss
(74) *Attorney, Agent, or Firm* — Norton Rose Fulbright US LLP (57) ABSTRACT

A method for determining a correction characteristic curve for adapting a characteristic curve of an injection system, in which the correction characteristic curve includes at least one deviation of a measured characteristic curve from a setpoint characteristic curve, the at least one deviation including a sum tolerance of at least two components of the injection system, which have an effect on the characteristic curve.

9 Claims, 6 Drawing Sheets

(56) References Cited

FOREIGN PATENT DOCUMENTS

| DE | 10 2004 006694 | 8/2005 |
| DE | 10 2004 046086 | 3/2006 |
| DE | 10 2006 000238 | 11/2006 |
| DE | 10 2007 036684 | 2/2008 |
| DE | 10 2007 062215 | 6/2009 |
| DE | 10 2010 000897 | 7/2011 |

* cited by examiner

METHOD FOR DETERMINING A CORRECTION CHARACTERISTIC CURVE

FIELD OF THE INVENTION

The present invention relates to a method and a system for determining a correction characteristic curve.

BACKGROUND INFORMATION

So-called self-learning functions are designed to detect and to store the properties and/or the tolerance situation as well as the drift over the service life of a component of the injection system during the operation of a common-rail injection system, and to compute corresponding correction values; this is disclosed in publication DE 10 2004 006 694 A1, for example.

Furthermore, devices are known for checking the fuel pressure which do not have a metering unit (MU) and in which a fuel pump (EFP) is used directly as the actuator for the rail pressure control. In these devices, a so-called pump characteristic curve results from the cooperation of various components, e.g., the EFP, the high-pressure pump, the EDC, and the lines as the characteristic curve for the high-pressure control.

Publication DE 10 2006 000 238 A1 discusses a control unit for a fuel supply system which has a common-rail accumulator for fuel which is supplied to an internal combustion engine via an injection. A learning device provided here stores the characteristic curve deviations which are computed by a first and a second computing device in a backup storage as learning values.

A method for controlling an internal combustion engine is discussed in publication DE 10 2007 036 684 A1. In this case, the adaptation of a state of a fuel vapor flushing system of the internal combustion engine and an adaptive learning of a characteristic curve of the fuel supply system are provided. A routine may, for example, include the adaptive learning of injector characteristic curves, fuel pump characteristic curves, or air metering errors.

Publication DE 10 2004 053 124 A1 discusses a common-rail fuel injection system. A control unit, which is also described, includes a learning device which controls a metering valve control value supplied to an intake metering valve of the common-rail fuel injection system in order to control the opening degree of the intake metering valve. The learning device controls the metering valve control value in such a way that the opening degree of the intake metering valve continuously increases starting from a preset value, which is lower than a limiting value, which implements the maximum ejection rate of the high-pressure pump, for implementing a maximum ejection rate. The learning device includes the instantaneous metering valve control value, which is supplied to the intake metering valve, as a maximum ejection rate control value, the learning device learning that the high-pressure pump reaches the maximum ejection rate at the maximum ejection rate control value.

SUMMARY OF THE INVENTION

Against this background, a method and a system having the features of the independent patent claims are presented. Further embodiments of the present invention result from the further description herein.

With the aid of the exemplary embodiments and/or exemplary methods of the present invention, a learning function for adapting a characteristic curve of at least one component of an injection system, e.g., an adaptive metering curve for checking a fuel pressure, among other things, is made available. Thus, a rail pressure control is typically possible via the fuel pump (EFP). The learning function may be used to determine at least one deviation of an instantaneously measured actual variable from a setpoint characteristic curve.

In order to reduce the overall tolerance of a device or system for checking the fuel pressure, a learning function is applied which detects the largest possible portion of tolerances of different components of an injection system and thus the sum tolerance of these components.

In one embodiment, the applied learning function is configured to detect the deviations of the pump characteristic curve with regard to a setpoint characteristic curve or a nominal characteristic curve, to store them, and to ascertain correction values. Within the scope of the exemplary embodiments and/or exemplary methods of the present invention, it is typically provided that the ascertained correction characteristic curve includes the sum tolerance of the components involved in the injection system. Since the deviations of the individual components vary for different operating conditions, the learning method detects only that portion of the deviations which correlates with the operating parameters taken into account in the learning method. Only a residual deviation of the injection system remains which cannot be corrected using the present learning function. However, a considerable increase in accuracy compared to a device and/or an injection system without a learning function is achieved and the robustness of the injection system with regard to tolerances of individual components and drifts is improved.

Actuator tolerances in the high-pressure control usually result in a deteriorated controller behavior or in a safety or substitute function being triggered. In one embodiment of the present invention, a learning algorithm for an adaptive metering curve (adaptive metering control, AMC) for controlling the fuel pressure is applied and transferred, in one embodiment, to a correction and/or a learning of a characteristic curve of the fuel pump, and thus a pump characteristic curve, and/or a pilot control engine characteristic map.

Furthermore, additional operating parameters may be taken into account in the learning method which are used to correct the learning values as a function of these operating parameters using correlation curves or engine characteristic maps which are stored in a module of the device designed as a control unit, for example.

The system according to the present invention is configured to carry out all steps of the presented method. Individual steps of this method may also be carried out by individual components of this system. Furthermore, functions of the system or functions of the individual components of the system may be implemented as steps of the method. In addition, it is possible to implement the steps of this method as functions of at least one component of the system or of the entire system.

Further advantages and embodiments of the present invention result from the description and the appended drawings.

It is understood that the above-named features and the features to be elucidated below are usable not only in the particular given combination, but also in other combinations or alone, without departing from the scope of the present invention.

DETAILED DESCRIPTION

The exemplary embodiments and/or exemplary methods of the present invention are illustrated schematically on the basis of specific embodiments in the drawings and is described in greater detail in the following with reference to the drawings.

The figures are described cohesively and comprehensively; identical reference numerals identify identical components.

Figure 1:
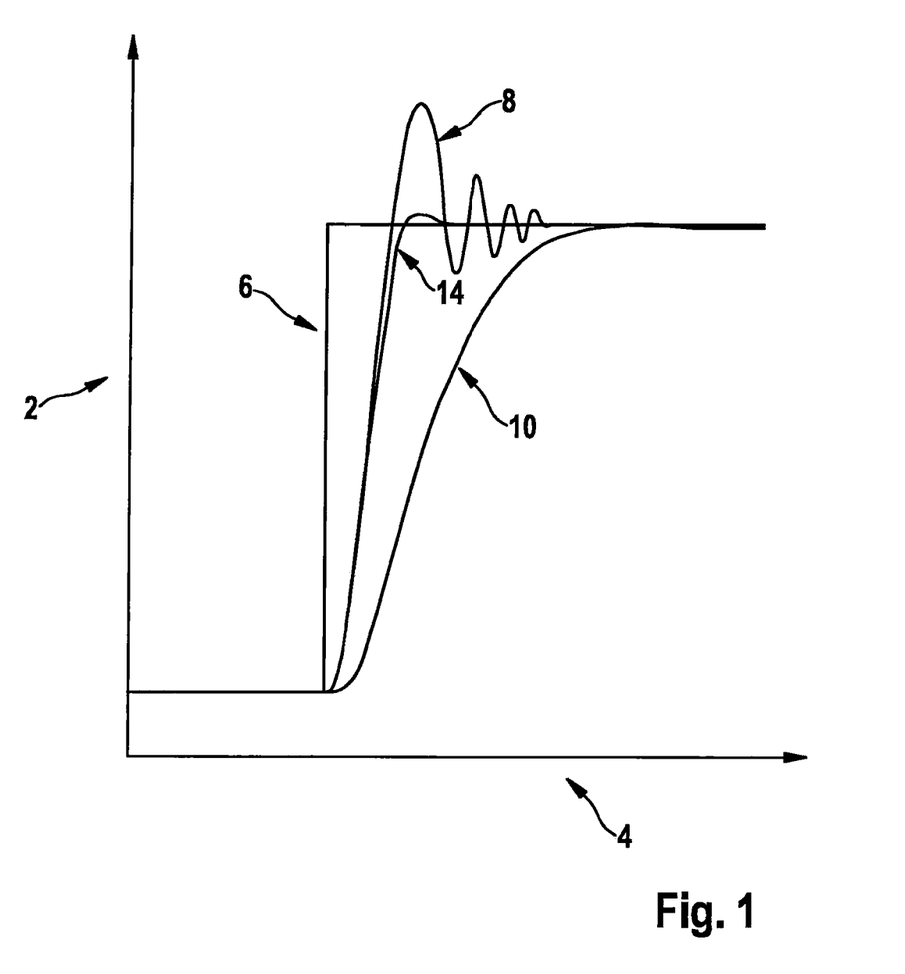
FIG. 1 shows a diagram of a fuel pressure in an accumulator injection system.

In the diagram from FIG. 1, a fuel pressure is plotted along an ordinate 2 in an injection system designed as an accumulator injection system, and thus a rail pressure of a common-rail system is plotted against an abscissa 4 for the time. In the diagram from FIG. 1, a first curve 6 for a setpoint value of the pressure, a second curve 8 for an overshoot of a rapidly controlled pressure, and a third curve 10 for a slowly controlled pressure are shown. Moreover, the diagram from FIG. 1 shows a fourth curve 14, which results when a specific embodiment of the method according to the present invention is used, for the pressure having an adaptive correction characteristic curve of a fuel pump for correcting a pump characteristic curve of the injection system. FIG. 1 shows that the best approach to first curve 6 for the setpoint value of the pressure is achieved by fourth curve 14.

Within the scope of a first and a second specific embodiment of the method according to the present invention, steady-state deviations are learned for controlling the fuel pressure. For this purpose, a $PIDT_1$ controller 20 is used. Moreover, a flow portion is used as a measure of the deviation of the fuel pump and/or of the metering unit from a nominal value or a setpoint value of an operating parameter in the case of a steady-state setpoint value. Within the scope of the method according to the exemplary embodiments and/or exemplary methods of the present invention, at least two concepts may be used for learning the steady-state flow portion.

Figure 2:
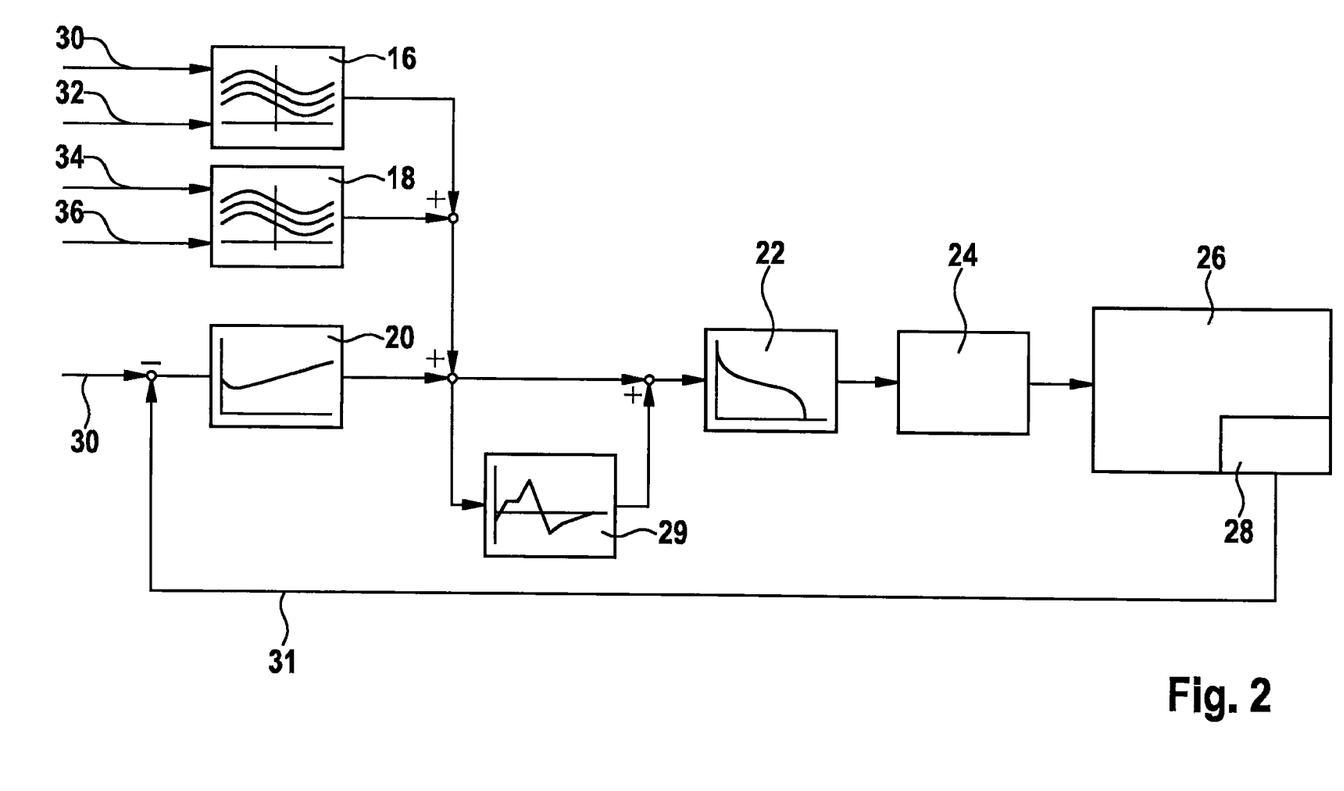
FIG. 2 shows a diagram of a first specific embodiment of the method according to the present invention.

Here, a correction intervention into a characteristic curve of the fuel pump, and thus the pump characteristic curve (PCC), takes place in one first specific embodiment (FIG. 2).

In one second specific embodiment of the method (FIG. 3), the correction intervention is carried out for a pilot control engine characteristic map (PCECM).

Figure 3:
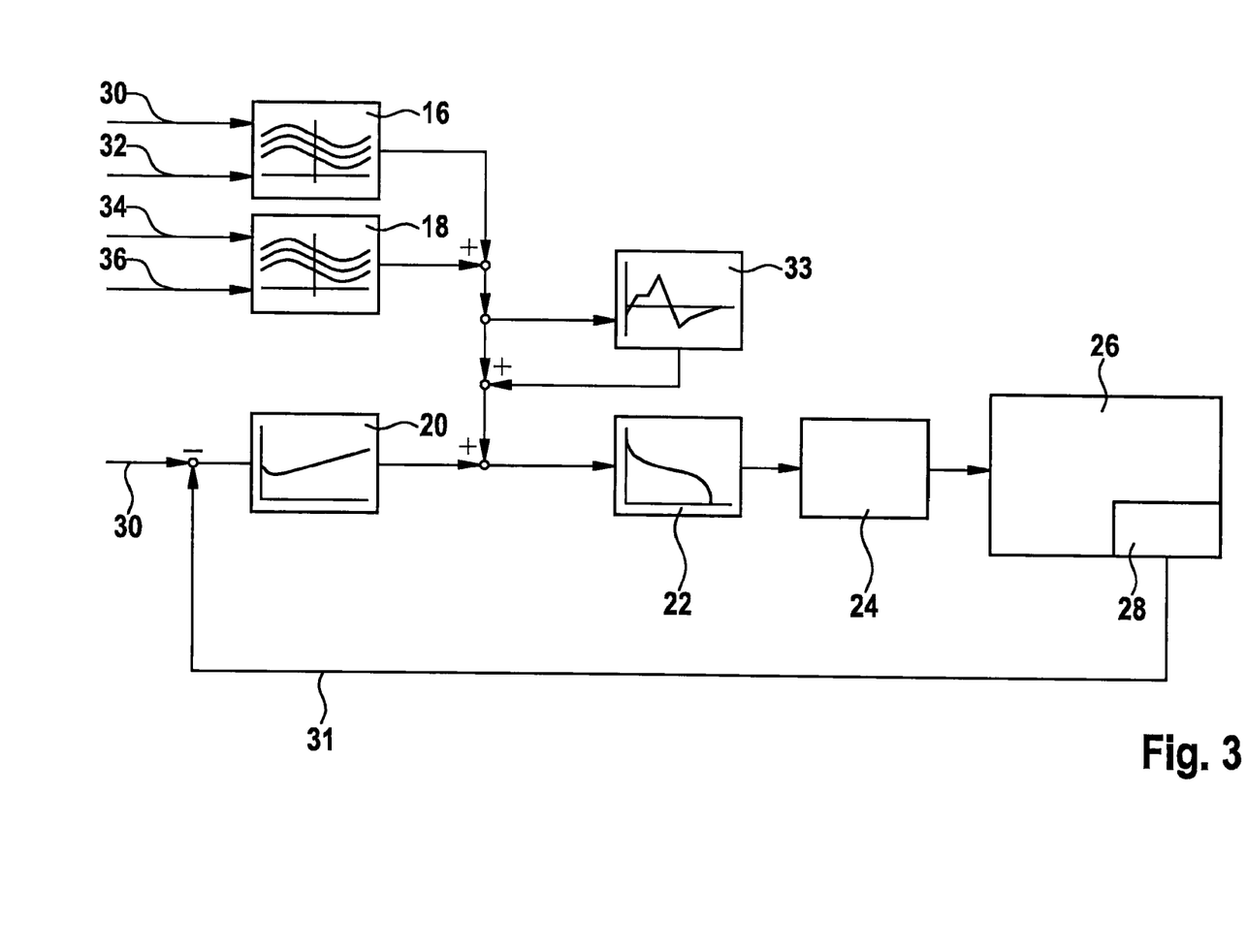
FIG. 3 shows a diagram of a second specific embodiment of the method according to the present invention.

The diagram from FIG. 2 shows a sequence for the first specific embodiment of a method according to the present invention, while the diagram from FIG. 3 describes the second specific embodiment of the method according to the present invention.

Both diagrams include the following common components: a first pre-checking device 16 and a second pre-checking device 18, a $PIDT_1$ controller 20, an inverted pump characteristic curve 22, and a flow control device 24. Pre-checking devices 16, 18 provide a pilot control engine characteristic map. Moreover, an injection system 26 which is designed as an accumulator injection system or a common-rail system and which has a pressure sensor 28 is schematically illustrated in both diagrams.

It is furthermore provided that actual value 31 of the pressure is also supplied from pressure sensor 28 to $PIDT_1$ controller 20. In both diagrams, $PIDT_1$ controller 20, inverted pump characteristic curve 22, control unit 24, as well as accumulator injection system 26 form a control loop.

Moreover, the diagram from FIG. 2 shows an associated correction characteristic curve 29 for correcting pump characteristic curve 22. For this purpose, this associated correction characteristic curve 29 for the pump is situated within the control loop in the diagram from FIG. 2 in the first specific embodiment of the method according to the present invention in such a way that correction characteristic curve 29 is ascertained within the control loop. The characteristic curve implemented as pump characteristic curve 22 is corrected within the control loop using correction characteristic curve 29.

In the diagram from FIG. 3 for carrying out the second specific embodiment of the method according to the present invention, a correction characteristic curve 33 for the pilot control engine characteristic map is situated outside the control loop so that correction characteristic curve 33 is made available outside the control loop. Thus, the pilot control engine characteristic map is corrected in this case outside the control loop using correction characteristic curve 33. Pilot control engine characteristic map (PCECM) is made available by pre-checking devices 16, 18.

Within the scope of the specific embodiments of the method according to the present invention shown with reference to the diagrams from FIGS. 2 and 3, a setpoint value 30 for a fuel pressure and a value for a cooling temperature 32 are supplied to first pre-checking device 16 as the operating parameters. A rotational speed 34 of the internal combustion engine and a value for a volume flow 36 of the fuel within injection system 26 are supplied to second pre-checking device 18 as the operating parameters.

In the first specific embodiment of the method according to the present invention, an adaptation of a characteristic curve, formed as pump characteristic curve 22, takes place with the aid of correction characteristic curve 29, as shown with reference to the diagram from FIG. 2. In this case, steady-state flow portions of the fuel are stored in correction characteristic curve 29 for the pump as learning values. A fuel quantity requested by the fuel pump is supplied to a correction input.

In the second specific embodiment of the method according to the present invention (diagram from FIG. 3), an adaptation of the pilot control engine characteristic map is carried out. Here, too, steady-state flow portions of the fuel are ascertained via the learning values of a learning function and stored as deviations in correction characteristic curve 33. Moreover, a pilot control quantity is supplied in the correction input.

Both in the first and in the second specific embodiments of the method according to the present invention, the learning function or a learning algorithm is applied to determine correction characteristic curves 29, 33, an associated adaptation of correction characteristic curves 29, 33 being carried out. Moreover, the supporting point positions of correction characteristic curves 29, 33 are adapted to a characteristic curve of injection system 26. New learning values for correction characteristic curves 29, 33 are merged with already present supporting points. For this purpose, supporting points having a low information content may be replaced by more meaningful supporting points. Using these measures, a high learning speed may be achieved for correction characteristic curves 29, 33. Errors which may occur during the carried-out learning process may be corrected.

Moreover, the gradient is monitored for correction characteristic curves 29, 33. By monitoring the local gradients of correction characteristic curves 29, 33, it is thus possible to ensure a monotony of pump characteristic curve 22 to be corrected thereby or of the pilot control engine characteristic map to be corrected thereby. It is also possible to ensure a stability of the control of the fuel pressure in injection system 26 in the presence of unphysical learning values.

With the aid of the method, an optimal control behavior may be ensured over an entire service life of injection system 26. A pressure dynamics may be improved by complying with admissible pressure overshoots. The method may also be used for various low-pressure circuits of injection system 26. In addition, a pressure control behavior in the case of common tolerances of components of injection system 26 may be improved. It is also possible to extend a service life of injection system 26 in the case of overshoots for high pressures within injection system 26.

Figure 4:
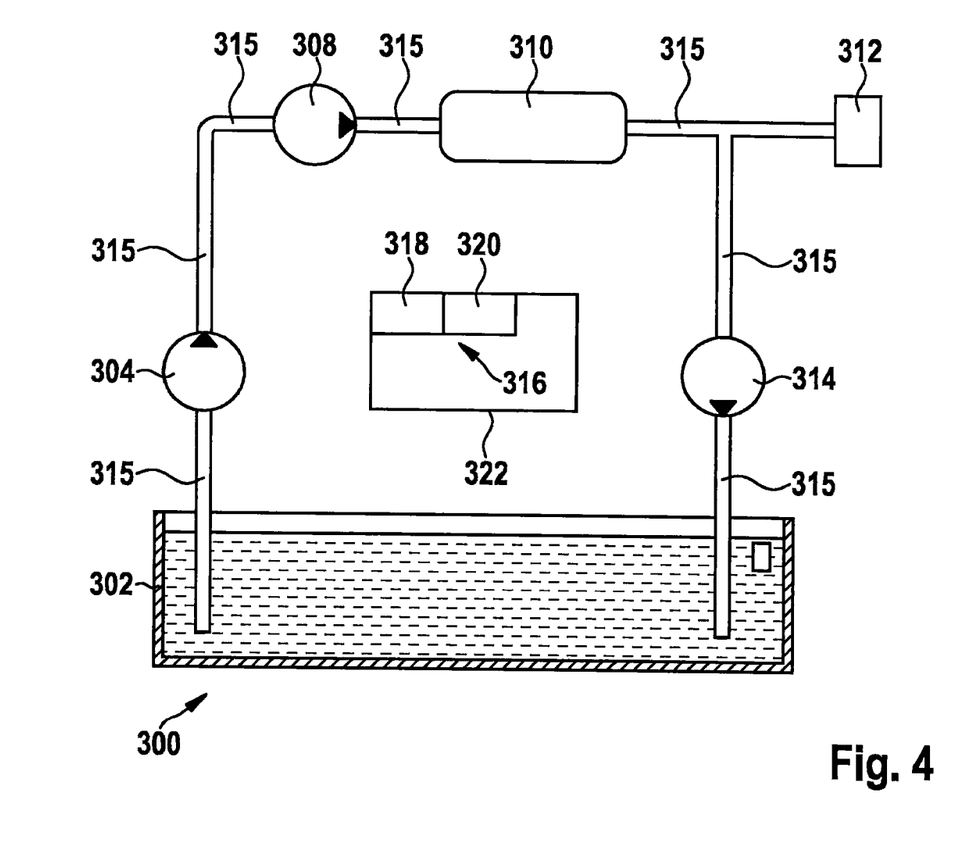
FIG. 4 schematically shows an example of an accumulator injection system as well as a first specific embodiment of a system according to the present invention.

FIG. 4 schematically shows an injection system 300 designed as an accumulator injection system for injecting fuel into an internal combustion engine according to the common-rail or accumulator injection method. This injection system 300 includes as components a reservoir 302 for the fuel, a fuel pump 304 and thus a pump for pumping the fuel from reservoir 302, as well as a high-pressure pump 308. This high-pressure pump 308 is designed to build up and maintain a fuel pressure within a high-pressure accumulator 310. For operating the internal combustion engine, the fuel is injected from fuel accumulator 310 into the combustion chambers of the internal combustion engine. In addition, injection system 300 includes a rail pressure sensor 312. The above-named components of the injection system are also connected to one another via lines 315 which are also designed as components of injection system 300.

In FIG. 4, one system 316 according to the present invention includes two modules 318, 320, which are designed as components of a control unit 322. Control unit 322 is also designed in this case to monitor and/or check and thus control and/or regulate the functions of the individual above-mentioned components of injection system 300 for an operation of injection system 300 regardless of whether the method according to the present invention is carried out.

It is provided that first module 318 of system 316 determines a correction characteristic curve for adapting a characteristic curve of injection system 300 which includes at least one deviation of a measured characteristic curve from a nominal characteristic curve or setpoint characteristic curve. This correction characteristic curve is detected and stored, and a correction value of the correction characteristic curve is ascertained. For this purpose, the at least one deviation includes a sum tolerance of at least two or all components of injection system 300 and, if necessary, a sum tolerance of control unit 322, which has an effect on the characteristic curve.

Second module 320 ascertains the at least one deviation using a learning function. In this way, an adaptive check of the fuel pressure in the injection system is possible, among other things.

Due to the interaction of the two modules 318, 320, the at least one deviation is stored in a memory of system 300, which is situated in second module 320, and the correction characteristic curve is ascertained therefrom, and at least one characteristic value from the correction characteristic curve is adapted to the learning function. As the characteristic curve, a pump characteristic curve of a pump of the injection system and/or a pilot control engine characteristic map of the injection system may be adapted and/or corrected using a correction characteristic curve. Using second module 320, a function of at least one component of the injection system may be checked, taking into account the correction characteristic curve.

As FIGS. 1 through 3 show, the high-pressure is usually controlled in the present invention by fuel pump 304 (EFP), an inverted pump characteristic curve 22 which describes the result of a cooperation of the components of injection systems 26, 300 being plotted for an injection system 26, 300. This characteristic curve, which is designed as an inverted pump characteristic curve 22 and which is usually also inverted, typically shows the connection between the supply quantity (flow through) of fuel through high-pressure pump 308 as a function of the activating electric current, the activating voltage, and/or the duty factor of the output stage of control unit 322 of fuel pump 304. This characteristic curve thus represents the sum of properties of the components involved in an injection to be carried out and their effect on the flow through high-pressure pump 308.

The control loop which is designed as a high-pressure control loop, for example, and the learning and/or the correction function are designed in such a way that they work with the values of the hydraulic flow through, which may be a high-pressure flow through. A controller as a component of control unit 322 adjusts the flow through according to the conditions of the rail pressure control on the basis of the setpoint and the actual pressures. This flow through is compared to a nominal value via the learning function. At least one deviation from the nominal value is stored using the learning function. A correction function from learned correction characteristic curves 29, 33 is used to ascertain a correction value for the flow through. In addition, according to the specific embodiments from FIGS. 2 and 3, for example, the pilot control and/or the input value having learned correction characteristic curves 29, 33 is/are corrected in pump characteristic curve 22 by the correction function using the correction value. It is provided that the correction function does not correct the activating voltage or the activating current of fuel pump 304, but rather the flow through on a higher system level.

Since pump characteristic curve 22 of injection system 26, 300 represents the sum of properties of the different components of injection system 26, 300 which are shown in the above-described figures, and all these components may have tolerances, the consequence is that the deviation of the flow through from a nominal value is the result of the sum of these tolerances. Since injection system 26, 300 is not able to recognize which tolerance causes the deviation, it may happen that the flow through corrected by the learning and/or the correction function does not correspond to the actual flow through. In this case, this usually is a virtual flow through for which, however, by taking into account pump characteristic curve 22, the flow through which is needed by injection system 26, 300 is set by the control signal of fuel pump 304, without an intervention of the controller being necessary. During a dynamic operation, this results in an optimal behavior of the rail pressure, even if the components have tolerances, as indicated in the diagram from FIG. 1.

One possible aspect with regard to the learning of the sum tolerance is the above-described correlation between the flow through as the sum of properties of various components of injection system 26, 300 and the fact that the learning and the correction are carried out in the range of the flow through.

Figure 5:
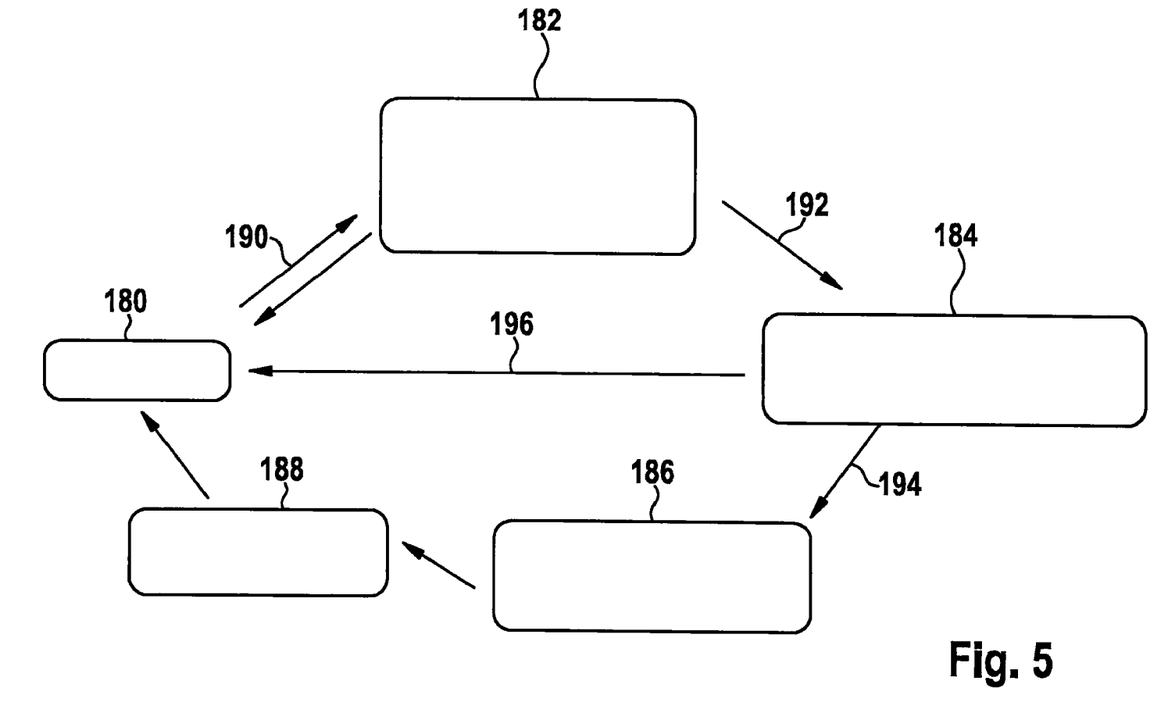
FIG. 5 shows a diagram of a finite state machine of a third specific embodiment of the method according to the present invention.

The diagram from FIG. 5 shows a correlation between states 180, 182, 184, 186, 188 which result in a third specific embodiment of the method according to the present invention.

Here, an initialization is carried out in a first state 180. Furthermore, an interaction between first state 180 and a second state 182, in which the method is started, is provided.

In second state 182 and thus the start of the method, evaluation variables are established and monitoring limits are initialized. In the interaction between first state 180 and second state 182, an activation of the adapted pump characteristic curve is carried out, the state of the control having the monitored operation in a closed control loop (Rail_stCtl-Loop=5) in an interaction 190, and the absolute value of the rail pressure control deviation being below a predefined threshold (|Rail_pDvt|<app_value). Limits (app_value<FISys_t<app_value) are provided for system temperature (FISup_t) which allow the unlimited operation of the injection system.

Starting from second state 182, the evaluation variables are summed up in a third state 184 by establishing 192 the state for control (Rail_stCtlLoop=5) and rail pressure control deviation (|Rail_pDvt|<app_value). Starting from third state 184, a predefined number of summations (Cnt=app_value) is established 194 in a first variant. Based on that, a calculation of an adaptation and thus a learning value of a learning function are carried out in a fourth state 186 to determine the deviations for the correction characteristic curves. Furthermore, a new correction characteristic curve is formed on the basis of the adaptation and/or the learning value. After fourth state 186, a new correction characteristic curve is activated in a fifth state 188, and subsequently, an initialization takes place corresponding to first state 180.

Starting from third state 184 and thus the summation of the evaluation variables, it is also possible that the first state and thus the initialization follows directly after third state 184. In this variant, it is provided in an establishment 196 that the state of the control does not have the monitored operation in closed control loop (Rail_stCtlLoop≈5), that the absolute value of the rail pressure control deviation is greater than a predefined threshold (|Rail_pDvt|>app_value), that the absolute value of the initial value of an integrator of the control is greater than a predefined value (|Rail_dvolMeUnCtl-l_init|>app_value), and that the absolute value of the volume flow control value is greater than a predefined value (|Rail_dvolMeUnSet_Vol_init|>app_value).

Figure 6:
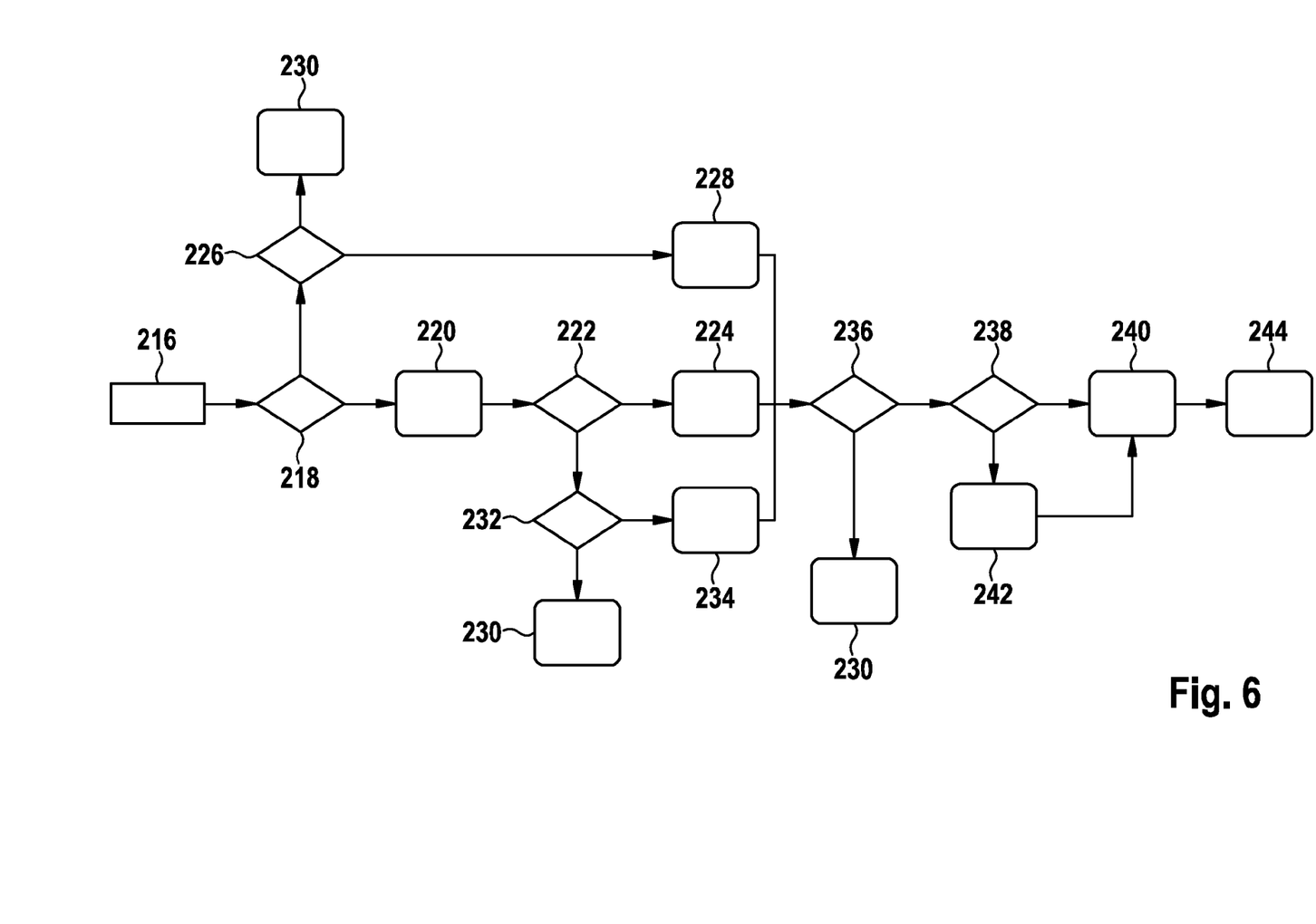
FIG. 6 shows a diagram of a fourth specific embodiment of the method according to the present invention.

FIG. 6 shows a diagram to illustrate a sequence of a fifth specific embodiment of the method according to the present invention. For this purpose, a new learning value is made available for a learning function in a first step 216. In a second step 218, a distance of the learning value from a learning point is determined. If such a determination is possible, a calculation 220 of an information content of the characteristic value is carried out in a third step 220. Subsequently, it is checked whether a free supporting point is present 222.

If such a free supporting point is present, learning value 216 is input 224. Should distance determination 218 not be possible, distance determination 226 of new learning value 216 is carried out starting from a merging point. If this distance determination 226 is possible, the supporting points are merged 228. If this is not possible, new learning value 216 is rejected and an old, already present correction characteristic curve is kept 230.

If a determination 222 of a free supporting point is not possible, a variable 232 of the information content of new learning value 216 is determined. If the information content is greater than the information content of an existing supporting point, the supporting point is deleted and new learning value 216 as well as at least one information content with regard to new learning value 216 are input into a new correction characteristic curve.

If variable determination 232 results in the information content being lower than the existing information contents of all supporting points, the new learning value is rejected and the old correction characteristic curve is kept 230.

Starting from supporting point fusion 228 as well as carried-out inputs 224, 234, a gradient of the correction characteristic curve is checked 236 at new learning value 216. If the gradient is not in order, new learning value 216 is rejected and the old correction characteristic curve is kept 230.

If check 236 of gradient $m_{KKL}$ is in order, a value range of learning value 216 is checked 238 in an additional step. If the value range is in order, the at least one information content of new learning value 216 is updated 240. If check 238 of the value range results in it not being in order, the value range is delimited 242 and an error bit is set, and the at least one information content is only updated 240 thereafter.

Finally, the supporting point having the at least one information content for new learning value 216 is detected 244 and thus stored and sorted for the correction characteristic curve to be determined and/or updated.

What is claimed is:

1. A method for determining a correction characteristic curve for adapting a characteristic curve of an injection system, the method comprising:
    ascertaining at least one deviation using a learning function, wherein the correction characteristic curve includes the at least one deviation, which is of a measured characteristic curve from a setpoint characteristic curve;
    wherein the at least one deviation includes a sum tolerance of at least two components of the injection system which have an effect on the characteristic curve.

2. The method of claim 1, wherein a sum tolerance of all components of the injection system is taken into account.

3. The method of claim 2, wherein the at least one deviation is stored and the correction characteristic curve is ascertained therefrom, and wherein the learning function is adapted using the ascertained correction characteristic curve.

4. The method of claim 1, wherein as the characteristic curve, a pump characteristic curve of a pump of the injection system is adapted.

5. The method of claim 1, wherein as the characteristic curve, a pilot control engine characteristic map of the injection system is adapted.

6. The method of claim 1, wherein the method is performed in a certain operating condition of the injection system, the certain operating condition being characterized by at least one operating parameter, and wherein only the portion of the deviation which correlates with the at least one operating parameter is taken into account for the correction characteristic curve.

7. The method of claim 1, wherein at least two, but not all, of a fuel pump, a fuel control unit, a high-pressure pump, a fuel accumulator, and lines are taken into account as components of the injection system for the sum tolerance.

8. A system for determining a correction characteristic curve for adapting a characteristic curve of an injection system, comprising:
- a control unit including at least one first module which determines a correction characteristic curve, including at least one deviation of a measured characteristic curve from a setpoint characteristic curve, the at least one first module having the at least one deviation taking into account a sum tolerance of at least two components of the injection system which have an effect on the characteristic curve, the at least one deviation being ascertained using a learning function.

9. The system of claim 8, the control unit further comprising:
- at least one second module configured to check a function of at least one component of the injection system, taking into account the correction characteristic curve.

* * * * *